United States Patent [19]
Dallas et al.

[11] Patent Number: 5,875,810
[45] Date of Patent: Mar. 2, 1999

[54] INFLATOR

[76] Inventors: W. Gordon Dallas, 688 Township Rd. 1600, Ashland, Ohio 44805; James F. Harrington, 173 Otterbein Dr., Lexington, Ohio 44904

[21] Appl. No.: 788,420

[22] Filed: Jan. 27, 1997

[51] Int. Cl.$^6$ .................. B65B 1/30; F16K 7/04
[52] U.S. Cl. .................. 137/224; 251/9; 141/197
[58] Field of Search .................. 137/224, 455; 251/9; 141/197, 313, 314, 317

[56] References Cited

U.S. PATENT DOCUMENTS

| | | | |
|---|---|---|---|
| 1,768,327 | 6/1930 | Nichols | 141/197 X |
| 2,001,777 | 5/1935 | Eger | 141/197 X |
| 2,926,705 | 5/1960 | Dorn | 141/197 X |
| 3,171,184 | 3/1965 | Posse | 251/9 X |
| 4,323,219 | 4/1982 | Carlin | 251/9 X |
| 4,362,193 | 12/1982 | Erdos et al. | 141/197 X |
| 5,653,272 | 8/1997 | McCaul | 141/197 X |

*Primary Examiner*—John Rivell
*Assistant Examiner*—Meredith H. Schoenfeld
*Attorney, Agent, or Firm*—Renner, Kenner, Greive, Bobak, Taylor & Weber

[57] ABSTRACT

A device (10) for inflating an object such as a ball (B) includes spaced arms (13, 14) carried by a bar (12). The arms (13, 14) are spaced a predetermined distance approximating the properly inflated diameter of the ball (B). An inflation needle (24) is positioned generally midway between the arms (13, 14) and is adapted to provide air under pressure, received through flexible tubing (26), to the ball (B). A clamp bar (28) is pivotally attached to one of the arms (13, 14) and has an aperture (33) therethrough to receive the tubing (26). When the ball (B) is being inflated, it will engage and pivot the clamp bar (28) until it pinches the tubing (26) to terminate the air flow to the needle (24).

18 Claims, 3 Drawing Sheets

INFLATOR

TECHNICAL FIELD

The present invention relates to an apparatus for inflating balls or other inflatable objects. More particularly, this invention relates to such a device which will automatically shut off the source of air to the ball when the ball is properly inflated to a predetermined size.

BACKGROUND ART

Oftentimes, for convenience and cost-effectiveness, balls of various types—for example, beach balls, volleyballs, basketballs, or playground balls—are shipped to retail stores uninflated. Consumers, however, prefer to purchase these types of balls in an inflated condition. As a result, retailers often use conventional air pumps to inflate balls in the store. Due to the need to inflate many balls, it is desirable to have a device which can quickly inflate each ball consistently to a desired size and pressure. Currently, ball inflators without an automatic shutoff system require the operator to use discretion as to when to terminate the air flow to the ball. Consequently, some balls are overinflated while others may be underinflated. Overinflation creates a risk of the ball bursting, particularly if exposed to heat, while underinflation creates dissatisfaction of the purchaser. Currently known ball inflators with an automatic shutoff are unduly complicated, difficult to maintain, and expensive.

Therefore, the need exists for a ball inflator which is capable of shutting off automatically once the inflating ball reaches a proper diameter. Currently, the ball inflators known in the art with automatic shutoff have electrical or complex mechanical shutoff valve mechanisms. The present invention is advantageous in that it is simpler to use, manufacture and maintain, and is less expensive and more reliable than those devices known in the art.

DISCLOSURE OF THE INVENTION

It is an object of the present invention to provide an inflator for a ball or the like that will inflate the ball to a predetermined diameter.

It is another object of the present invention to provide an inflator, as above, that shuts off air flow to the ball automatically when the ball reaches a predetermined diameter.

It is yet another object of the present invention to provide an inflator, as above, which can be used to inflate balls of differing diameters.

It is a further object of the present invention to provide an inflator, as above, that may be used on any substantially flat surface.

It is an additional object of the present invention to provide an inflator, as above, having a design that renders it relatively simple and inexpensive to manufacture.

These and other objects of the present invention, which will become apparent from the description to follow, are accomplished by the improvements hereinafter described and claimed.

In general, an inflator for an object includes first and second arms spaced a predetermined distance from each other. An inflation device is positioned generally midway between the arms and is adapted to provide air under pressure to the object, the air being received through flexible tubing connected to the device. One of the arms carries a clamp bar which is engaged by the object as it is being inflated to shut off the air flow to the inflation device when the object is properly inflated.

A preferred exemplary inflator incorporating the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
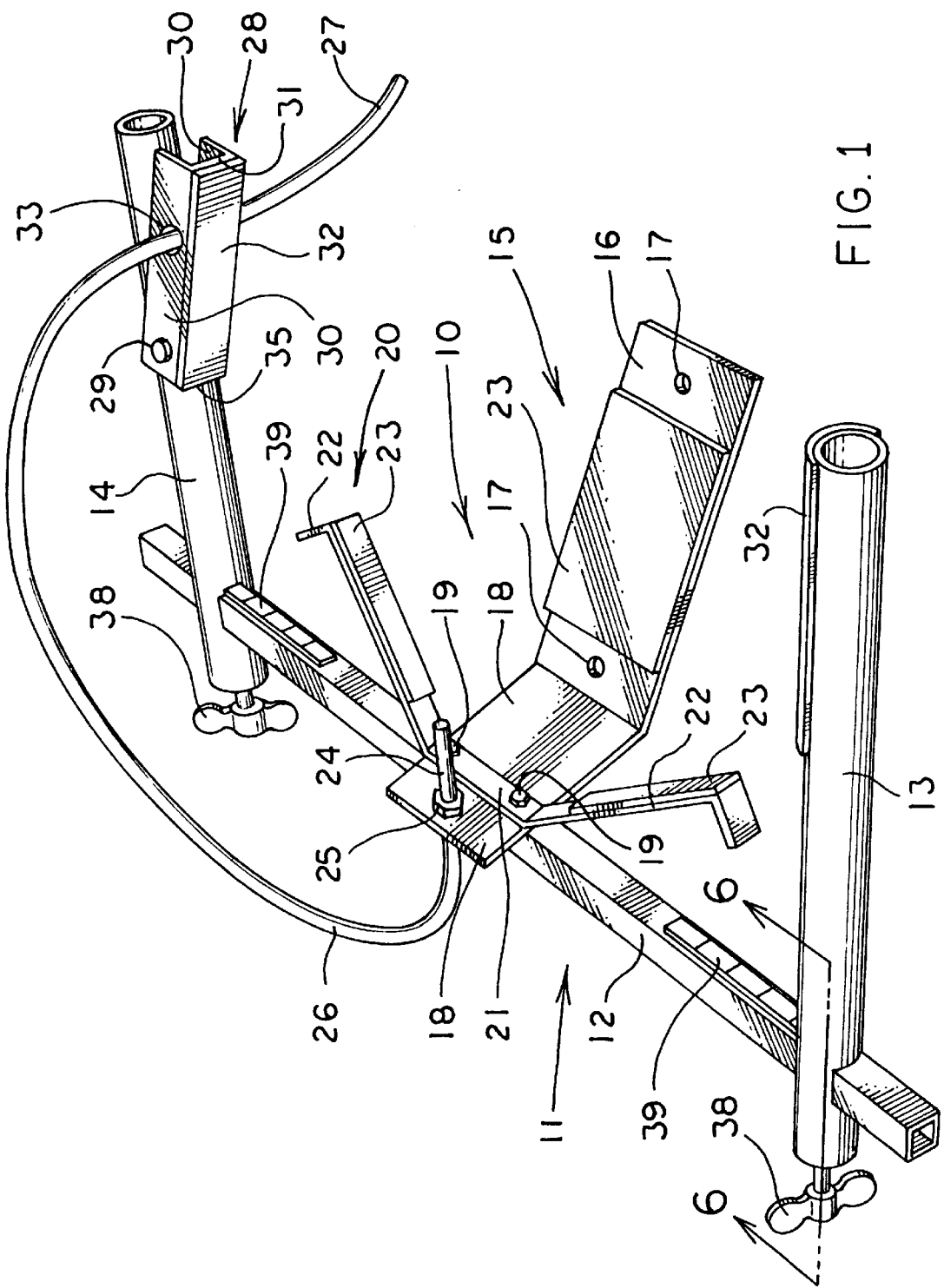
FIG. 1 is a perspective view of an inflator made in accordance with the concepts of the present invention.

An inflator according to the present invention is indicated generally in the accompanying drawings by the numeral 10. Inflator 10 is designed to be positioned directly on a substantially planar surface and may be fabricated from any of a variety of materials, but it has been found that fabricating inflator 10 from metal results in a sturdy device that is relatively easy and inexpensive to manufacture.

Inflator 10 includes a generally U-shaped frame, indicated generally by the numeral 11. Frame 11 includes a preferably hollow support bar 12, shown preferably to be in the form of square tube stock (but which could be a row), and a pair of preferably hollow spaced arms 13, 14 carried by bar 12. Arms 13, 14 are shown in the form of round tubes but, of course, could be of other configurations such as the square tube 12. Bar 12 also carries a base member generally indicated by the numeral 15. Base member 15 includes a support plate 16 having apertures 17 therein so that inflator 10 may be mounted on any suitable flat surface. Base member 15 also includes a plate 18 which extends at an acute angle, preferably about thirty-five degrees, from support plate 16. Plate 18, and thus base member 15 is attached to bar 12 as by bolts 19. When positioned on a flat surface arms 13 and 14 thus extend upwardly away from bar 12 at an angle of about thirty-five degrees.

Figure 2:
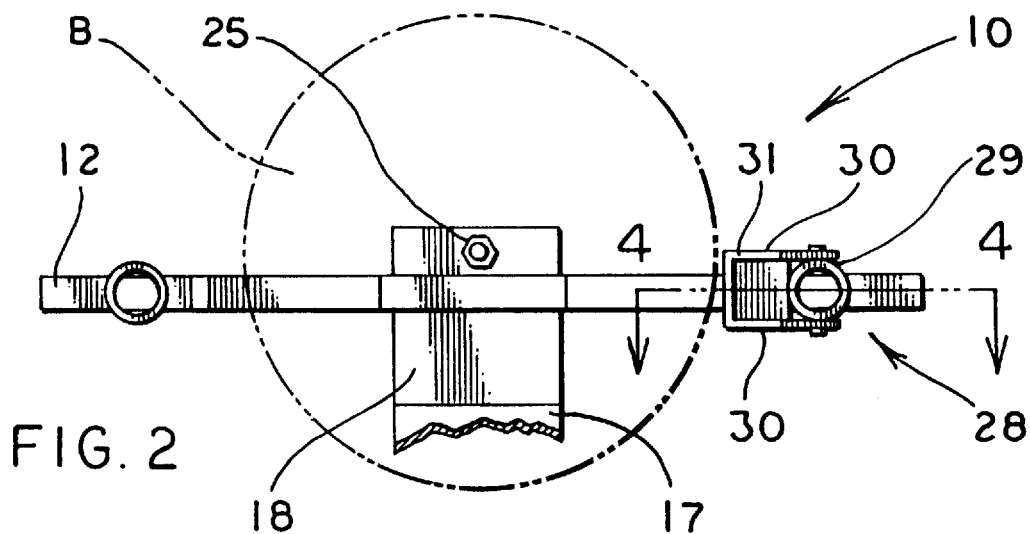
FIG. 2 is a fragmented side elevational view of the inflator show in FIG. 1.
Figure 3:
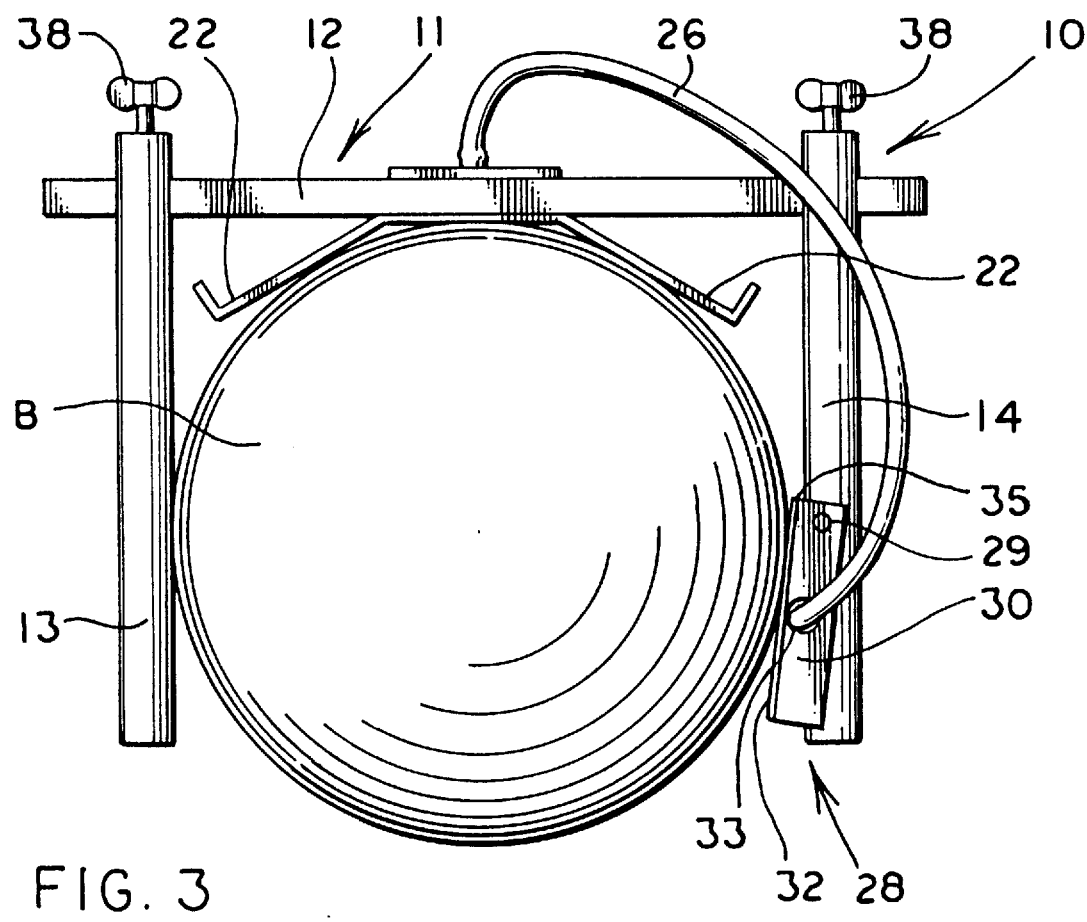
FIG. 3 is a somewhat schematic top plan view of the inflator shown in FIG. 1.

Bolts 19 may also be utilized to attach a ball positioning bracket, generally indicated by the numeral 20, to bar 12. Bracket 20 includes a base portion 21 of a lateral extent generally corresponding to the width of plate 18, and two positioning arms 22. Arms 22 extend outwardly from the edges of base portion 21 at an acute angle, preferably about twenty-seven and one half degrees. Together, arms 22 and support plate 16 are intended to support a ball B as it is being inflated as shown in FIGS. 2 and 3. To that end, arms 22 and support plate 16 may be provided with carpet-like pads 23 so that ball B does not contact the metallic members. Such is desirable because vinyl or rubber balls have a high coefficient of friction and without pads 23, ball B may tend to grab arms 22 and plate 16 as it is being inflated.

Bracket 20 and base plate 15 are preferably attached to bar 12, by bolts 19 as previously described, midway between arms 13 and 14. At that location, that is, midway between arms 13 and 14, a conventional inflating needle 24 may be mounted to plate 18 as by nut 25 in a conventional fashion. Needle 24 communicates with pressurized air from a source (not shown) via flexible tubing 26 connected at one end to needle 24 and having its other end 27 in communication with the air source.

Figure 4:
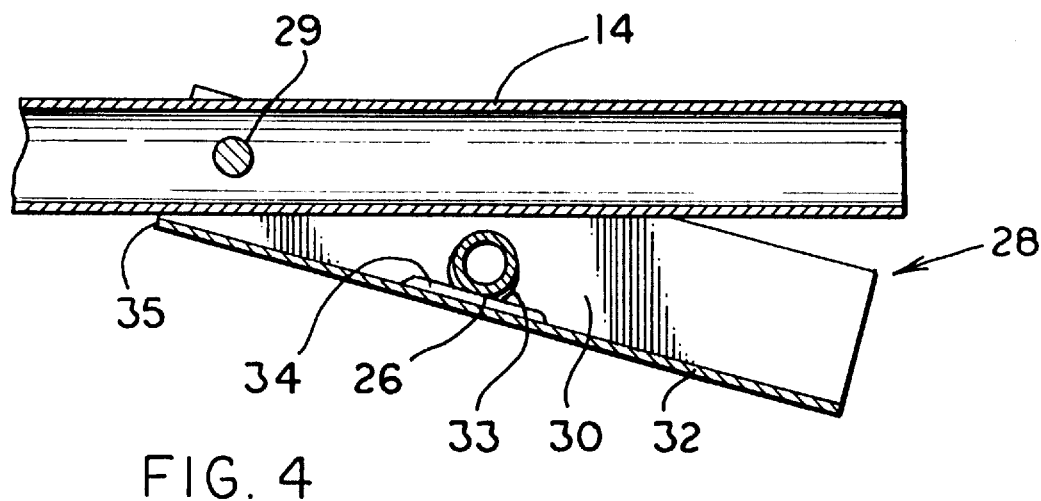
FIG. 4 is an enlarged sectional view showing the inflator hose in the open position, taken substantially along line 4—4 of FIG. 2.

A clamp bar, generally indicated by the numeral 28, is pivotally attached, as at pin 29, to one of the arms 13 or 14, it being shown attached to arm 14. Bar 28 is U-shaped in section having arms 30 connected to, and spaced from each other by, a base member 31. Base member 31 and the end of arm 13 may be provided with pads 32 which, like pads 23, provide a frictionless surface as ball B begins to contact base member 31 and arm 13 as will hereinafter be described. The pivot pin attachment 29 extends through arm 14 and arms 30 which are spaced far enough apart to straddle tube 14. Arms 30 are also provided with aligned apertures 33 through which tubing 26 extends. As shown in FIG. 4, apertures 33 are preferably generally circular in nature and surround tubing 26, but not tightly so that the air flow through tubing 26 is not normally pinched off.

Figure 5:
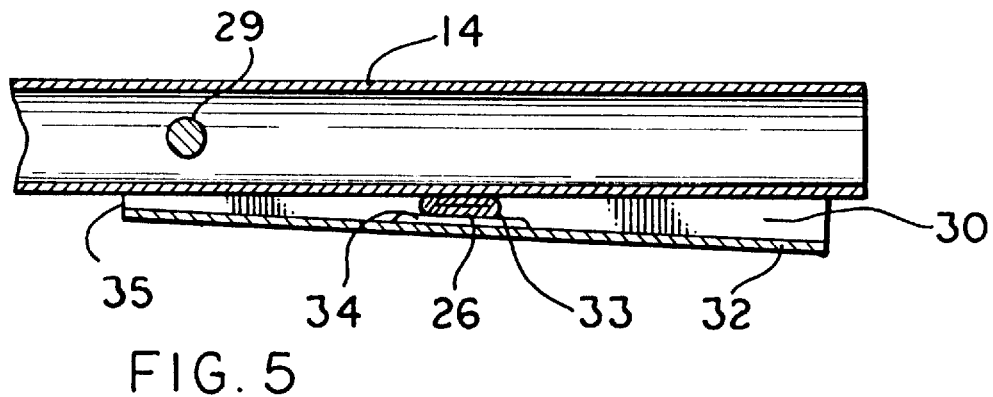
FIG. 5 is an enlarged sectional view of the inflator hose, similar to FIG. 4, but showing the inflator hose in the pinched position.

With clamp bar 28 in the position shown in FIGS. 1 and 4, inflator 10 is in condition to inflate a ball B. Needle 24 is placed in a ball B, such as a beach ball, and the uninflated ball is positioned between arms 22 and on base member 15. Arms 13 and 14 are spaced a predetermined distance generally equal to the diameter of a properly inflated ball B, in this instance a beach ball. Ball B then begins to inflate sliding on pads 23 as it grows, as shown in FIG. 2, and as it approaches its properly inflated size, it contacts clamp bar 28 and causes clamp bar 28 to pivot on pin 29. Eventually, tubing 26 is pinched between an embossment 34 extending inwardly from base number 31 and arm 14, as shown in FIG. 5, and air flow to ball B is essentially stopped and the properly inflated ball B can be removed. When ball B is removed, air again can flow through tubing 26 as the force thereof rotates clamp bar 28 away from arm 14 until end 35 of base member 31 of bar 28 rests against arm 14 as shown in FIG. 1. Inflator 10 thus automatically positions itself ready to receive and inflate another ball B.

Figure 6:
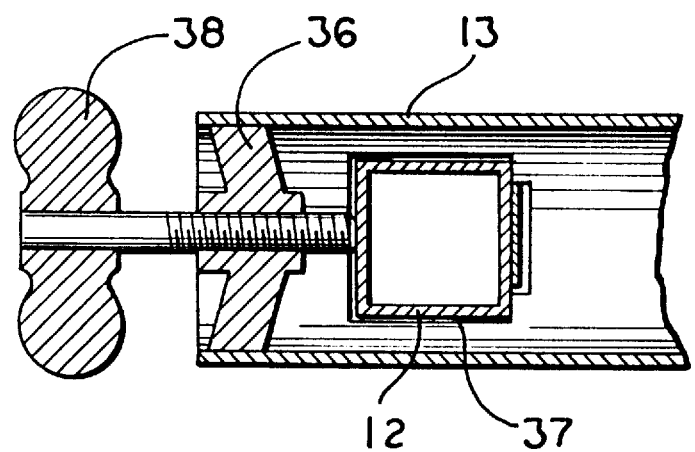
FIG. 6 is an enlarged sectional view of the mechanism for adjusting the position of the arms taken substantially along line 6—6 of FIG. 1.

If desired, inflator 10 may be rendered adjustable to accommodate balls having differing diameters when properly inflated. The manner in which such adjustment can be accomplished is best shown in FIG. 6. A threaded pedestal 36 is formed within the inner end of each arm 13, 14 adjacent to the generally square aperture 37 through which bar 12 may pass. A set screw 38 is threaded through pedestal 36 to engage bar 12 to thereby hold arms spaced at the desired predetermined position. Loosening each screw 38 allows arms 13 and 14 to slide on bar 12 when adjustment is required. To assist in locating the proper predetermined distance between arms 13 and 14, calibration scales 39 may be affixed to bar 12 as shown in FIG. 1.

It should thus be evident that an inflator made in accordance with the concepts of the present invention can be used to inflate balls of any diameter with an automatic air-flow shutoff upon reaching that diameter. As such, the inflator accomplishes the objects of the present invention and otherwise substantially improves the art.

We claim:

1. An apparatus for inflating an object comprising first and second arms spaced a predetermined distance from each other, an inflation device positioned generally midway between said arms and adapted to provide air under pressure to the object, flexible tubing connected to said inflation device to provide air under pressure to said inflation device, and a clamp bar carried by one of said arms, said clamp bar being engaged by the object as it is being inflated to shut off the air flow to said inflation device by engaging said flexible tubing when the object is properly inflated.

2. Apparatus according to claim 1 wherein said clamp bar is pivotally attached to said one of said arms.

3. An apparatus for inflating an object comprising first and second arms spaced a predetermined distance from each other, an inflation device positioned generally midway between said arms and adapted to provide air under pressure to the object, flexible tubing connected to said inflation device to provide air under pressure to said inflation device, and a clamp bar pivotally attached to one of said arms, said clamp bar having an aperture therethrough, said tubing being received through said aperture, said clamp bar being engaged by the object as it is being inflated to shut off the air flow to said inflation device when the object is properly inflated.

4. Apparatus according to claim 3 wherein said clamp bar is generally U-shaped in configuration having spaced arms, each of said arms of said clamp bar having a said aperture, said tubing spanning the distance between said arms of said clamp bar such that when the object engages said clamp bar, said clamp bar pivots to pinch said tubing against said one of said arms.

5. Apparatus according to claim 4 further comprising an embossment on said clamp bar to assist in pinching said tubing.

6. An apparatus for inflating an object comprising first and second arms spaced a predetermined distance from each other, an inflation device positioned generally midway between said arms and adapted to provide air under pressure to the object, an object-positioning bracket positioned generally midway between said arms, flexible tubing connected to said inflation device to provide air under pressure to said inflation device, and a clamp bar carried by one of said arms, said clams bar being engaged by the object as it is being inflated to shut off the air flow to said inflation device when the object is properly inflated.

7. Apparatus according to claim 6, said bracket having spaced arms to engage the object.

8. Apparatus according to claim 7 further comprising a pad carried by each of said arms of said bracket.

9. Apparatus according to claim 7 further comprising a bar carrying said first and second arms, said bracket being connected to said bar.

10. Apparatus according to claim 1 further comprising a base member adapted to be attached to a flat surface.

11. An apparatus for inflating an object comprising first and second arms spaced a predetermined distance from each other, a bar carrying said first and second arms, a base member adapted to be attached to a flat surface, said base member being connected to said bar with said first and second arms extending upwardly at an angle of about thirty-five degrees relative to said base member, an inflation device positioned generally midway between said arms and adapted to provide air under pressure to the object, flexible tubing connected to said inflation device to provide air under pressure to said inflation device, and a clamp bar carried by one of said arms, said clamp bar being engaged by the object as it is being inflated to shut off the air flow to said inflation device when the object is properly inflated.

12. An apparatus for inflating an object comprising first and second arms spaced a predetermined distance from each other, a base member adapted to be attached to a flat surface, a pad carried by said base member, an inflation device positioned generally midway between said arms and adapted to provide air under pressure to the object, flexible tubing connected to said inflation device to provide air under pressure to said inflation device, and a clamp bar carried by one of said arms, said clamp bar being engaged by the object as it is being inflated to shut off the air flow to said inflation device when the object is properly inflated.

13. An apparatus for inflating an object comprising first and second arms spaced a predetermined distance from each other, an inflation device positioned generally midway between said arms and adapted to provide air under pressure to the object, flexible tubing connected to said inflation device to provide air under pressure to said inflation device, a clamp bar carried by one of said arms, a pad carried by said clamp bar, and a pad carried by the other of said arms, said clamp bar being engaged by the object as it is being inflated to shut off the air flow to said inflation device when the object is properly inflated.

14. Apparatus according to claim 1 further comprising means to adjust said predetermined distance between said first and second arms.

15. Apparatus according to claim 14 further comprising a bar, said arms being slidably received on said bar.

16. Apparatus according to claim 15 wherein said means to adjust includes a screw for each said arm extending through said bar to engage each said arm to hold each said arm in a predetermined position relative to said bar.

17. Apparatus according to claim 16 further comprising calibrating indicia placed on said bar to assist in locating said arms at said predetermined position.

18. Apparatus according to claim 1 wherein said predetermined distance is the approximate diameter of the object being inflated.

* * * * *